Figure 1:
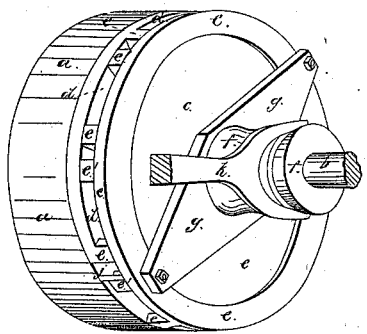

W. H. Elliot,
Governor.

Nº 12,586. Patented Mar. 27, 1855.

UNITED STATES PATENT OFFICE.

WILLIAM H. ELLIOT, OF PLATTSBURGH, NEW YORK.

COMBINATION OF SPEED AND RESISTANCE GOVERNOR.

Specification of Letters Patent No. 12,586, dated March 27, 1855.

*To all whom it may concern:*

Be it known that I, WILLIAM H. ELLIOT, of Plattsburgh, in the county of Clinton, in the State of New York, have invented a new and useful Improvement in the Machinery for Governing Steam and Water Power; and I do hereby declare that the following is a full and exact description of the same.

The nature of my invention consists in so combining an elastic or resistance governor with the ordinary centrifugal or velocity governor, that by their separate action on a compound valve or gate, or other equivalent mechanism, any variation either in the work to be performed, or in the speed attained shall in a corresponding degree graduate the steam opening, or other channel of power, giving thereby a corresponding resultant regulation, without either of the said governors interfering with the action of the other. That is to say a given amount of increase or decrease of the resistance of the machinery driven, will produce its exact proportional change in the propelling power, whatever may be the position of the valve or gate of the velocity governor, and a given amount of change in the velocity of the machinery, will also produce its exact proportional effect upon the propelling power, whether the resistance of the machinery be much or little. The resistance governor being operated only by a change in the amount of resistance of the machinery driven, consequently not effected by any change of velocity, it becomes necessary to use it in combination with a velocity governor so as to provide for irregularity in the amount of propelling power, such as a greater or less pressure of steam or head of water. These two governors acting upon separate openings or valves in the same pipe, would have the effect only of one governor, for instance, if the amount of resistance were suddenly increased, the valve or gate of the resistance governor would be as suddenly opened, but the valve of the velocity governor being in another part of the pipe, no more steam could pass through the pipe till the change of velocity should open the valve of the velocity governor also, and so let a sufficient amount of steam pass, as it would do if the resistance governor were not there. To provide for this difficulty, the hereinafter described compound balance valve and gate have been constructed, in which both governors are made to act upon the same opening; the velocity governor having the effect of widening or narrowing the valve of the resistance governor according to the strength of the propelling power, and in any position leaving to the resistance governor exactly the same proportional effect.

To enable others skilled in the art to make and use my invention I will proceed to describe its construction and operation, reference being had to the accompanying drawings, and to the letters of reference marked thereon, the same letters indicating the same parts.

Figures 1 and 1'.—A resistance governor composed principally of two disk wheels, one of which makes a part of the main driving pulley $a, a, a,$ and is loose upon the main shaft $b, b,$ the other disk $c, c, c,$ is secured to the shaft. $a, a$ the driving disk and $c, c,$ the driven disk. From one to the other of these disks the whole power is transmitted through springs $d, d, d, d,$ which are interposed between the projections $e, e, e,$ on the face of the driving disk, and the projections $e', e', e',$ on the face of the driven disk. When power is applied to the main pulley both disks move around together occupying the same relative positions as when at rest, until the driven disk, by being connected with other machinery through the main shaft, offers resistance to the driving disk, when the springs begin to close, and the disks to alter their relative positions, and as the resistance of the driven disk increases or decreases, the springs close or open and the two disks in the same degree change their relative positions. $f, f$ a collar which when in operation moves longitudinally upon the main shaft. $h,$ deep grooves for the reception of forked lever $k.$ $g, g,$ arms of the collar which extend to the edge of the disk, into the ends of these arms the rods $i, i,$ are secured, these rods pass loosely through the driven disk to the inclined groove $j,$ on the driving disk; an elongated head on the end of these rods fill the grooves. Now when resistance causes the disks to change their relative positions by compressing the springs the heads on the ends of the rods $i, i,$ pass along in the inclined groove; and as one end of the inclined groove is nearer to the driven disk than the other, the rods are made to pass through the driven disk, causing the collars *f, f*, to move longitudinally upon the shaft, one end of forked lever *k*, being fixed in the groove *h*, and the other end attached to the valve or gate, the propelling power by this means is increased or decreased with every change of resistance.

Figure 2:
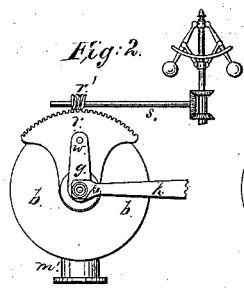

Fig. 2.—End elevation of the compound balance valve, showing its connection with the velocity governor.

Figure 3:
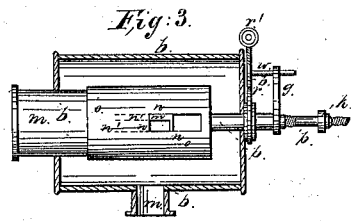

Fig. 3.—Front elevation of the same with a portion of the steam box removed to show the working of the valve, *l, l, l, l*, cylindrical steam box having one inlet pipe *m, m*, and one outlet pipe *m'* the inlet pipe extends into the box to a considerable distance and has its inner end closed up. *o, o*, cylindrical valve fitting over the end of the inlet pipe, through each side of which there is an opening *n, n, n, n*, and through each side of the inlet pipe there is also an opening *n', n', n'*, exactly corresponding in size and shape with the opening in the valve. When these openings correspond in position, the valve is open and the steam escapes into the steam box and out of it at the outlet pipe *m'*, but the valve is made to close these openings by either of two motions, one by revolving around the inlet pipe which is controlled by the velocity governor; and one by sliding longitudinally over the inlet pipe, which motion is controlled by the resistance governor, so that each governor has perfect control over the valve opening without being influenced by the other. *p, p*, valve rod passing through the end of the steam box, by which means the valve receives both its motions. *k* end of forked lever which is secured to the end of the valve rod. The valve receives its longitudinal motion from the resistance governor through the forked lever. *g*, an arm secured to the valve rod through which pin *w*, passes freely. Pin *w*, is secured to and projects from segment *r*. Consequently any motion given to segment *r*, by worm gear *r'* is communicated to the valve by means of pin *w*, arm *g*, and valve rod *p, p*. Rod *s* connects worm gear *r'* with the bevel gears of a velocity governor, which gives to the valve its rotary motion.

Figure 4:
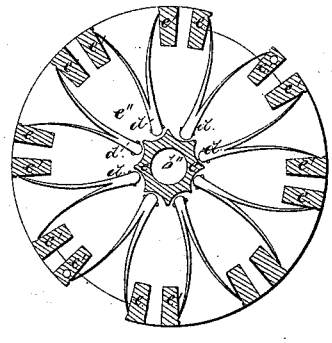
Figure 1:
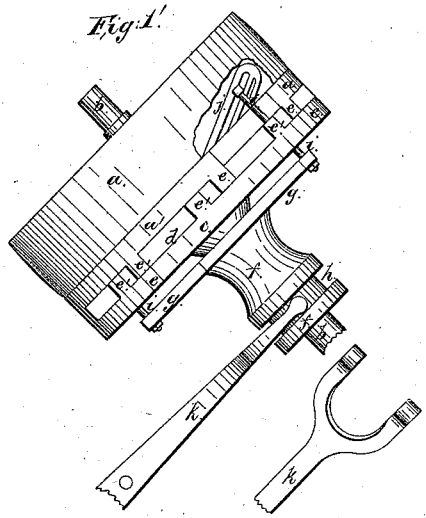

Fig. 4.—Face of one of the disk wheels showing the position of the springs, and the position also of the opposite disk. By this arrangement the whole power is transmitted through the springs, the inclined groove being entirely out of the line of power between the propelling power, and the machinery propelled, and consequently the friction of the inclined groove, is only that which is necessary to move a balance valve. The springs indicate precisely the same resistance in approaching the maximum of their power, that they do in approaching the minimum of their power from the maximum, because that power which is expended in depressing the springs in the improved resistance governor, is all given back as they release themselves by overcoming the resistance; but when the whole power is transmitted from the face of one incline to that of the other, it requires much more resistance to indicate a given amount of propelling power, in approaching the maximum, than in approaching the minimum of power, because that power which is expended in depressing the spring by means of the inclines, is only in part returned it being minus the friction of the inclines. These remarks are made in explanation of the improvement set forth in claim third.

Figure 5:
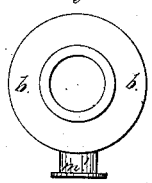

Fig. 5.—End elevation of the compound balance valve, showing the inlet pipe.

Figure 6:
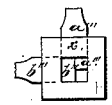

Fig. 6.—Compound gate, in this as in the case of the compound valve both governors act upon the same opening at the same time, and with the same effect, one gate being controlled by the velocity governor, and one by the resistance governor.

I do not claim a centrifugal governor, or a resistance governor, when used separately, as I am aware that a governor of the latter character was patented by W. Gardner June 10th 1851. But What I do claim as my invention, and desire to secure by Letters Patent is—

The combination of a speed governor with a resistance governor in such a manner that each shall exert its own proper effect upon the motive power producing thereby a compound resultant regulation, without either of the said governors interfering with the action of the other, as herein set forth.

WILLIAM H. ELLIOT.

F. L. SAILLY,
G. M. BECKWITH.